(12) United States Patent
Hodge

(10) Patent No.: US 6,900,263 B2
(45) Date of Patent: May 31, 2005

(54) TIRES FOR HEAVY LOADS AND USE OF A RUBBER COMPOSITION TO DELAY IRREGULAR WEAR ON THESE TIRES

(75) Inventor: Thomas Hodge, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/201,439

(22) Filed: Jul. 21, 2002

(65) Prior Publication Data

US 2003/0055140 A1 Mar. 20, 2003

Related U.S. Application Data

(62) Division of application No. 09/778,144, filed on Feb. 7, 2001.

(30) Foreign Application Priority Data

Feb. 7, 2000 (FR) .............................. 00 01513

(51) Int. Cl.⁷ ................................. C08K 3/34
(52) U.S. Cl. ...................... 524/492; 524/262; 524/269; 524/493; 524/571; 524/575.5; 525/343
(58) Field of Search ................ 524/262, 269, 524/575.5, 571, 492; 525/343

(56) References Cited

U.S. PATENT DOCUMENTS

| | | | |
|---|---|---|---|
| 3,873,489 A | 3/1975 | Thurn et al. ......... 260/33.6 AQ |
| 3,978,103 A | 8/1976 | Meyer-Simon et al. .................... 260/448.8 R |
| 3,997,581 A | 12/1976 | Pletka et al. .......... 260/448.8 R |
| 4,002,594 A | 1/1977 | Fetterman et al. ....... 260/42.37 |
| 4,360,049 A | 11/1982 | Imai et al. .................. 152/209 |
| 5,227,425 A | * 7/1993 | Rauline ....................... 524/493 |
| 5,420,193 A | * 5/1995 | Matsue et al. ............... 524/495 |
| 5,580,919 A | 12/1996 | Agostini et al. ............ 524/430 |
| 5,583,245 A | 12/1996 | Parker et al. ............... 556/427 |
| 5,663,396 A | 9/1997 | Musleve et al. ............ 556/427 |

(Continued)

FOREIGN PATENT DOCUMENTS

| EP | 0705721 | 4/1996 |
|---|---|---|
| EP | 0735088 | 10/1996 |
| EP | 0810258 | 12/1997 |
| FR | 2765882 | 1/1999 |
| JP | 175120 | 7/1997 |
| JP | 105513 | 4/1999 |
| WO | 8805448 | 7/1988 |
| WO | 9637547 | 12/1996 |
| WO | 9928376 | 6/1999 |

*Primary Examiner*—David W. Wu
*Assistant Examiner*—Henry S. Hu
(74) *Attorney, Agent, or Firm*—Fitzpatrick, Cella, Harper & Scinto

(57) ABSTRACT

The present invention relates to tires suitable for bearing heavy loads, and to the use of a rubber composition to form the treads of such tires which delays the appearance of irregular wear on the treads of such tires during travel. The invention applies to tires for motor vehicles, such as heavy vehicles, construction vehicles or aircraft. The rubber composition comprises:

an elastomeric matrix comprising majoritarily at least one diene elastomer having at one or more of its chain ends a functional group which is active for coupling to a reinforcing white filler,
a reinforcing filler comprising at least 50% by weight a reinforcing white filler, and
a reinforcing white filler/functionalized diene elastomer bonding agent.

The present invention relates to tires suitable for bearing heavy loads, and to the use of the rubber composition to delay the appearance of irregular wear on the treads of such tires during travel. The invention applies to tires for motor vehicles, such as heavy vehicles, construction vehicles or aircraft.

4 Claims, 1 Drawing Sheet

U.S. PATENT DOCUMENTS

| | | | | |
|---|---|---|---|---|
| 5,674,932 A | * | 10/1997 | Agostini et al. | 524/430 |
| 5,684,171 A | | 11/1997 | Wideman et al. | 556/427 |
| 5,684,172 A | | 11/1997 | Wideman et al. | 556/427 |
| 5,696,197 A | | 12/1997 | Smith et al. | 524/495 |
| 5,871,597 A | * | 2/1999 | Vasseur | 152/209.5 |
| 5,977,238 A | | 11/1999 | Labauze | 524/492 |
| 5,989,719 A | * | 11/1999 | Loiselle | 428/447 |
| 6,013,718 A | * | 1/2000 | Cabioch et al. | 524/506 |
| 6,028,137 A | | 2/2000 | Mahmud et al. | 523/215 |
| 6,156,822 A | | 12/2000 | Materne et al. | 152/151 |
| 6,177,503 B1 | * | 1/2001 | Araki et al. | 524/492 |
| 6,191,205 B1 | * | 2/2001 | Micouin et al. | 524/492 |
| 6,765,045 B1 | * | 7/2004 | Daniel et al. | 524/237 |

* cited by examiner

TIRES FOR HEAVY LOADS AND USE OF A RUBBER COMPOSITION TO DELAY IRREGULAR WEAR ON THESE TIRES

CROSS REFERENCE TO RELATED APPLICATION(S)

The present application is a divisional application of U.S. application Ser. No. 09/778,144, filed Feb. 7, 2001, which claims priority to French Application No. FR00/01513, filed Feb. 7, 2000.

BACKGROUND OF THE INVENTION

The present invention relates to tires suitable for heavy loads and to the use of a rubber composition in treads for such tires, where such composition leads to a delay in the appearance of irregular wear on the treads during travel. The present invention is applicable to tires for heavy loads, such as on motor vehicles, heavy vehicles, construction vehicles and aircraft.

The wear resistance of a tire that bears heavy loads is evaluated by measuring the weight loss of this tire relative to a control tire and following travel over the same distance, which is sufficient to involve a significant weight loss. Independent of the wear resistance, "moment of appearance of the irregular wear on a tread" is conventionally understood to mean the moment at which the gradient of the characteristic "loss of weight of rubber as a function of traveling distance" increases substantially. This gradient is sometimes referred to as "weight loss rate". This sudden change in gradient coincides with the formation of specific facies of irregular wear on the radially outer face of the tread.

The facies of irregular wear may be characterized, on one hand, by a very high weight loss rate at the location of the edges of the central ribs which are located close to the median circumferential plane of the tread and, on the other hand, by a weight loss rate at the location of the ribs of the "shoulder" zone of the tread which is much higher than that relating to the central ribs.

Various methods have been attempted to delay the appearance of irregular wear in a tire tread bearing heavy loads. A first method involved acting on the forms of the tread patterns, as described, for example, in patent specifications JP-A-99/105 513, JP-A-97/175 120 or EP-A-705 721. A second method involved producing a tread in two parts, as described in U.S. Pat. No. 4,360,049.

As provided in U.S. Pat. No. 4,360,049, a radially outer part (i.e. one intended to be in contact with the ground) is formed from a rubber composition, the elastomeric matrix of which comprises primarily a copolymer of styrene and butadiene, with carbon black as reinforcing filler. This radially outer part provides the corresponding tread with irregular wear which is satisfactorily delayed. Moreover, the tread is satisfactorily resistant to attack due to travel. However, the rubber composition used in this outer part has high hysteresis losses.

This is the reason that a radially inner part for the tread is provided, which is in contact with the outer protective crown ply. This radially inner part is formed from a composition having relatively low hysteresis losses, the effect of which is to limit the internal heating of the tread during travel and, consequently, limit the rolling resistance of the tire.

A third method provides a tread characterized by the specific formulation of the rubber composition which constitutes the tread.

First, rubber compositions for use in treads comprised an elastomeric matrix based on natural rubber, which has lower hysteresis, with carbon black as reinforcing filler. However, such compositions provide relatively reduced adhesion to treads comprising such compositions.

A further approach was to replace the aforementioned compositions with compositions comprising an elastomeric matrix based on a copolymer of a conjugated diene monomer and a vinyl-aromatic monomer, such as a copolymer of styrene and butadiene, reinforced with carbon black. Such compositions impart to the corresponding treads satisfactory wear resistance, delay in irregular wear, and good resistance to attack due to travel. However, these compositions have very high hysteresis losses.

Improvements included adding to the copolymer an active function at the chain end for coupling to the carbon black. The compositions thus obtained had hysteresis losses which are substantially equivalent to those of natural rubber. However, such compositions impart to the tread insufficient resistance to attack. Moreover, they do not make it possible to delay the irregular wear or to provide satisfactory wear resistance in the treads.

In order to overcome all the aforementioned disadvantages, in particular the hysteresis losses, the wear resistance and the irregular wear, attempts have been made recently to replace the above traditional tread compositions with those that use silica as the primary reinforcing filler instead of carbon black.

The reinforcement of rubber compositions comprising natural rubber or a copolymer of a conjugated diene and a vinyl-aromatic compound prepared in solution, with silica as the major reinforcing filler provides hysteresis losses which are relatively low for the corresponding compositions. However, such compositions do not make it possible to satisfactorily delay the irregular wear for treads formed from these compositions. Moreover, the wear resistance is unsatisfactory.

It should be noted that the use of a silica reinforcing filler results in compositions comprising a synthetic polymer, which are difficult to process. Furthermore, the cost of preparing these compositions is relatively high, because of the requirement for a silica/elastomer bonding agent.

The use of a carbon black/silica blend as reinforcing filler provides the same aforementioned disadvantages, in relation to filler based on carbon black or silica in the relative mass fractions which are used.

The inventor has unexpectedly discovered an improved cross-linkable rubber composition that can be used to form the entire tread of a tire used for bearing heavy loads.

SUMMARY OF THE INVENTION

The invention provides for heavy vehicle tires, the treads of which are formed from a cross-linked rubber composition comprising:
(a) an elastomeric matrix comprising primarily one or more essentially unsaturated dieneelastomer(s), the elastomer comprising at one or more of its chain ends a functional group which is active for coupling to a reinforcing white filler;
(b) a reinforcing filler, a majority of which is a reinforcing white filler (i.e., in a mass fraction of greater than 50% total reinforcing filler); and
(c) a reinforcing white filler/functionalized diene elastomer bonding agent.

The use of this composition in a tire tread used on tires for heavy loads advantageously delays the appearance of irregular wear of the tread during travel, without affecting the wear resistance and rolling resistance of the tread compared to known treads for heavy vehicle tires, which are conventionally formed from compositions primarily based on natural rubber and carbon black or based on copolymers of a conjugated diene and a vinyl aromatic compound and silica.

BRIEF DESCRIPTION OF THE DRAWING

The invention will be better understood in view of the appended drawing in which.

DETAILED DESCRIPTION OF THE INVENTION

Figure 1:
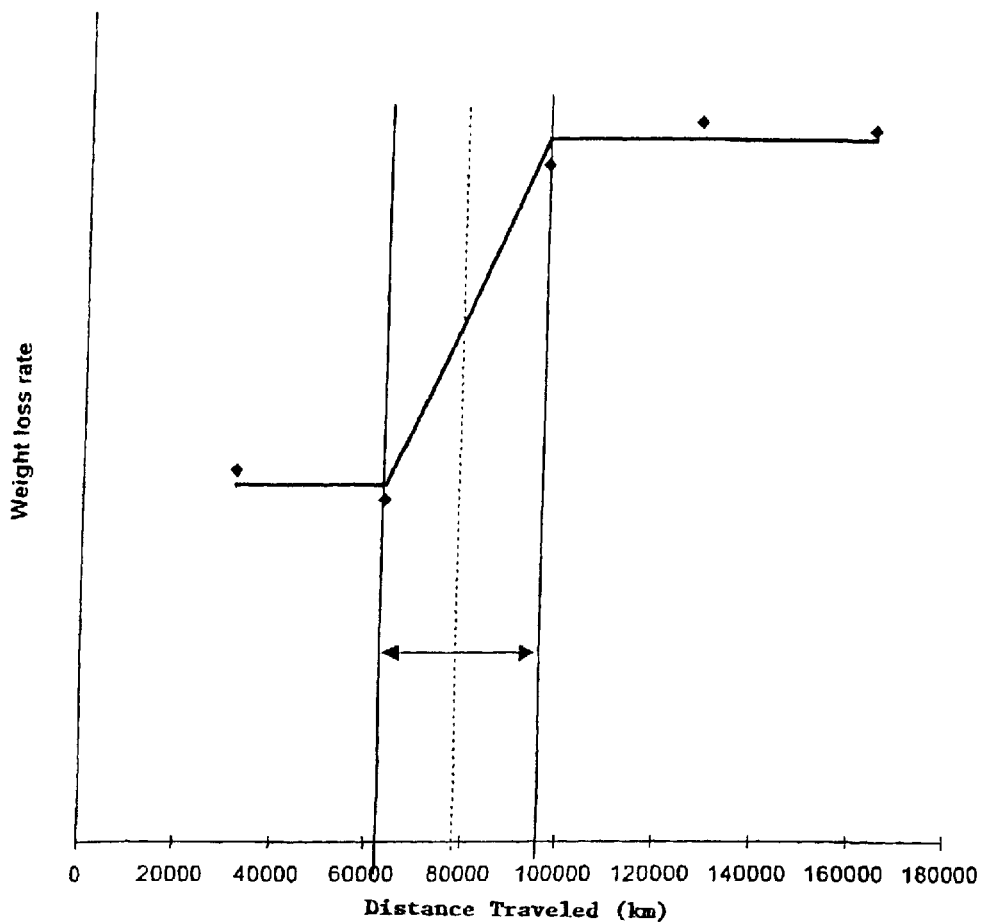
FIG. 1 is a graph showing weight loss rate of a tire as a function of distance traveled (in km).

"Diene" elastomer or rubber is understood herein to mean, an elastomer resulting at least in part (i.e. a homopolymer or a copolymer) from diene monomers (monomers bearing two double carbon-carbon bonds, whether conjugated or not).

Generally, "essentially unsaturated" diene elastomer is understood herein to mean a diene elastomer resulting at least in part from conjugated diene monomers, having a content of members or units of diene origin (conjugated dienes) which is greater than 15% (mole %).

Within the category of "essentially unsaturated" diene elastomers, "highly unsaturated" diene elastomer is understood to mean a diene elastomer having a content of units of diene origin (conjugated dienes) which is greater than 50%.

These definitions being given, the following are understood to be meant by diene elastomer capable of being used in the compositions according to the invention:

(a) any homopolymer obtained by polymerization of a conjugated diene monomer having 4 to 12 carbon atoms; and (b) any copolymer obtained by copolymerization of one or more dienes conjugated together or with one or more vinyl aromatic compounds having 8 to 20 carbon atoms.

Suitable conjugated dienes include 1,3-butadiene, 2-methyl-1,3-butadiene, 2,3-di(C1 to C5 alkyl)-1,3-butadienes such as, 2,3-dimethyl-1,3-butadiene, 2,3-diethyl-1,3-butadiene, 2-methyl-3-ethyl-1,3-butadiene, and 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

Preferably, the essentially unsaturated diene elastomer of the composition according to the invention is a copolymer formed from a conjugated diene monomer and a vinyl-aromatic monomer.

The copolymer may contain between 99% and 20% by weight of diene units and between 1% and 80% by weight of vinyl aromatic units. The copolymer may have any microstructure, which is a function of the polymerization conditions used, in particular of the presence or absence of a modifying and/or randomizing agent and the quantities of modifying and/or randomizing agent used. The copolymer may be for example, block, statistical, sequenced or microsequenced and is prepared in solution.

Butadiene-styrene copolymers prepared in solution (referred to hereafter as SBR) are preferred, in particular those having a styrene content of between 10% and 50% by weight and a glass transition temperature (Tg) of from −70° C. to −20° C. are suitable as essentially unsaturated diene elastomers of the composition according to the invention.

Additional essentially unsaturated diene elastomer copolymers may be used in the composition according to the invention. Such elastomers are selected among highly unsaturated diene elastomers prepared in solution which include butadiene-isoprene copolymers (BIR), isoprene-styrene copolymers (SIR), butadiene-styrene-isoprene copolymers (SBIR), and mixtures of two or more of these compounds.

The functional group present at one or more chain ends of the elastomers which is active for coupling to a reinforcing white filler may be any functional group known to the person skilled in the art for coupling to silica. Coupled or starred elastomers may also be used for the invention, provided that they are active for the aforementioned coupling.

Non-limiting examples of such functional groups are provided below.

Thus, the following functional groups are suitable within the scope of the invention:

a silanol group or a polysiloxane block having a silanol end, as described in the assignee's U.S. Pat. No. 6,013,718 incorporated herein by reference.

an alkoxysilane group.

U.S. Pat. No. 6,013,718 teaches the use of a functionalizing agent for a living polymer obtained anionically in order to obtain a function which is active for coupling to silica. This functionalizing agent comprises a cyclic polysiloxane, such as a polymethylcyclo -tri, -tetra or -deca siloxane, preferably hexamethylcyclotrisiloxane. The functionalized polymers thus obtained are separable from the reaction medium by steam extraction of the solvent, without changing their macrostructure and, consequently, their physical properties.

The functionalization reaction may be carried out as described in WO 88/05448 for coupling to silica, which consists of reacting a living polymer obtained anionically with an alkoxysilane compound having at least one non-hydrolyzable alkoxy radical. This compound is selected from among haloalkyl alkoxysilanes.

Alkoxysilane functions may also be obtained according to French patent specification FR-A-2,765,882 which discloses the use of a trialkoxysilane, such as 3-glycidyloxypropyltrialkoxysilane, for functionalizing a living diene polymer, in order to couple the functionalized polymer to a carbon black having silica fixed to its surface as the majority reinforcing filler.

The amount of active functions obtained on the functionalized elastomer according to the invention is preferably greater than 70%.

The compositions of the invention may contain a single diene elastomer comprising one or more functional groups which are active for coupling to a reinforcing white filler, or a blend of this elastomer with any other elastomer conventionally used in tires, such as natural rubber. Alternatively, the composition may comprise a blend based on natural rubber and a synthetic elastomer which is optionally coupled and/or starred or alternatively partially or completely functionalized so as to have a functional group which does not exhibit the aforementioned activity.

There is a direct relationship between the fraction of elastomer in the composition according to the invention which contains the functional group that is active for coupling to a reinforcing white filler and the improvement in the properties of the composition. The higher the fraction, the greater the improvement and vice versa.

This fraction of elastomer which is devoid of the active functional group may vary between 1 and 70 parts by weight per 100 parts of elastomer (phr) comprising said group according to the invention.

The compositions according to the invention may be prepared using known thermomechanical working processes carried out in one or more stages. For example, they may be obtained by thermomechanical working in one stage in an internal mixer which lasts from 3 to 7 minutes, with a speed of rotation of the blades of 50 rpm. Alternatively, the compositions may be prepared in two stages in an internal mixer which last from 3 to 5 minutes and from 2 to 4 minutes, respectively, followed by a finishing stage carried out at about 80° C., during which the sulphur and the vulcanization accelerators for sulphur-cross-linked compositions are incorporated.

The reinforcing white filler which is used as reinforcing filler may constitute the entire or major part of the total reinforcing filler. When the white filler is the major portion, it may be associated with carbon black.

Preferably, the reinforcing white filler constitutes the majority, i.e. more than 50% by weight, of the total reinforcing filler, more preferably more than 80% by weight. Experience has shown that the above properties of the composition according to the invention show maximum improvement with a mass fraction of reinforcing white filler in the reinforcing filler. The properties are optimized when the composition contains solely one reinforcing white filler, for example silica, as reinforcing filler. This latter case therefore constitutes a preferred example of a rubber composition according to the invention.

The reinforcing white filler is present in the composition in a quantity from 20 to 80 phr (parts by weight per hundred parts of said elastomeric matrix).

In the present application, "reinforcing" white filler is understood to mean a white filler (sometimes also referred to as "clear filler") which is capable, on its own, without any other means than an intermediate coupling agent, of reinforcing a rubber composition intended for the manufacture of tires. In other words the reinforcing white (or clear) filler is capable of replacing a conventional filler of carbon black in its reinforcement function.

Preferably, the reinforcing white filler is entirely or primarily silica ($SiO_2$). The silica used may be any reinforcing silica known to those skilled in the art, in particular any precipitated or pyrogenic silica having a BET surface area and a specific CTAB surface area both of which are less than 450 $m^2/g$. The highly dispersible precipitated silicas are preferred.

More preferably, the silica has specific BET or CTAB surfaces, both of which are from 80 $m^2/g$ to 260 $m^2/g$. The Brunauer-Emmett-Teller (*BET*) specific surface area is determined in known manner, in accordance with the method of Brunauer, Emmet and Teller described in *"The Journal of the American Chemical Society"*, vol. 60, page 309, February 1938, and corresponding to Standard AFNOR-NFT-4507 (November 1987). The cetyl trimethyl ammonium bromide (*CTAB*) specific surface area is the external surface area determined in accordance with Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limiting examples of such preferred highly dispersible silicas include the silica Perkasil KS 430 from Akzo, the silicas BV3380 and Ultrasil 7000 from Degussa, the silicas Zeosil 1165 MP and 1115 MP from Rhodia, the silica Hi-Sil 2000 from PPG, the silicas Zeopol 8715 or 8745 from Huber, and treated precipitated silicas such as, for example, the aluminium-"doped" silicas described in application EP-A-0 735 088.

The physical state in which the reinforcing white filler is present is immaterial, whether it be in the form of a powder, microbeads, granules or alternatively balls. Of course, "reinforcing white filler" is also understood to mean mixtures of different reinforcing white fillers, in particular of highly dispersible silicas such as described above.

The reinforcing white filler may also be used in a blend (mixture) with carbon black. Suitable carbon blacks are all the carbon blacks, in particular the blacks of the type HAF, ISAF and SAF, which are conventionally used in tires, and particularly in treads for tires. Non-limiting examples of such blacks include the blacks N115, N134, N234, N339, N347 and N375. The amount of carbon black in the total reinforcing filler may vary within wide limits, with the amount preferably being less than the total amount of reinforcing white filler present in the rubber composition.

For example, black/silica blends or blacks partially or integrally covered with silica are suitable to form the reinforcing filler. Carbon blacks modified by silica, such as, the fillers sold by CABOT under the name "CRX 2000", which are described in WO-A-96/37547 are also suitable.

The reinforcing white filler may also be an alumina ($Al_2O_3$), preferably an alumina of high dispersibility such as described in EP-A-810 258, or an aluminium hydroxide, such as described in WO 99/28376.

The rubber composition according to the invention also comprises, a reinforcing white filler/elastomeric matrix bonding agent (also referred to as coupling agent), the function of which is to ensure sufficient chemical and/or physical bonding (or coupling) between the white filler and the matrix, while facilitating the dispersion of this white filler within said matrix.

Such a bonding agent, which is at least bifunctional, has, for example, the simplified general formula "Y-T-X", in which:

—Y  represents a functional group ("Y" function) which is capable of bonding physically and/or chemically with the white filler, such a bond being able to be established, for example, between a silicon atom of the coupling agent and the hydroxyl (OH) surface groups of the filler (for example, surface silanols in the case of silica);
—X  represents a functional group ("X" function) which is capable of bonding physically and/or chemically with the elastomer, for example by means of a sulphur atom; and
—T  represents a hydrocarbon group that links Y and X.

These bonding agents are not to be confused with simple agents for covering the filler in question which, in known manner, may comprise the Y function which is active with respect to the filler but are devoid of the X function which is active with respect to the elastomer.

Such bonding agents, of variable effectiveness, have been described in a large number of documents and are well-known to the person skilled in the art. Any bonding agent known to or likely to ensure the effective bonding between the silica and diene elastomer such as organosilanes, in particular polysulphurized alkoxysilanes or mercaptosilanes, or polyorganosiloxanes bearing the above-mentioned X and Y functions may be used in the compositions according to the invention.

The coupling agent used in the rubber compositions according to the invention is preferably a polysulphurized alkoxysilane, which bears two types of functions referred to here as "Y" and "X", which can be grafted first onto the white filler by means of the "Y" function (alkoxysilyl function) and second onto the elastomer by means of the "X" function (sulphur function).

Polysulphurized alkoxysilanes are well-known as coupling agents (white filler/diene elastomer) in rubber compositions intended for the manufacture of tires. See, in particular, U.S. Pat. Nos. 3,842,111; 3,873,489; 3,978,103; 3,997,581; 5,580,919; 5,583,245; 5,663,396; 5,684,171; 5,684,172; and 5,696,197, which describe such known compounds in detail.

Particularly suitable coupling agents for implementing the invention, without the definition below being limiting, are so-called "symmetrical" polysulphurized alkoxysilanes which satisfy the following general formula (I):

$$Z\text{-}A\text{-}S_n\text{-}A\text{-}Z, \quad (I)$$

in which:
n is an integer from 2 to 8;
A is a divalent hydrocarbon radical;
Z corresponds to one of the formulae below:

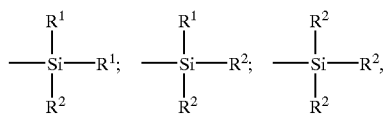

in which:
$R^1$, which may or may not be substituted, and may be identical or different, represents a $C_1$–$C_{18}$ alkyl group, a $C_5$–$C_{18}$ cycloalkyl group, or a $C_6$–$C_{18}$ aryl group; and
$R^2$, which may or may not be substituted, and may be identical or different, represents a $C_1$–$C_{18}$ alkoxyl group or a $C_5$–$C_{18}$ cycloalkoxyl group.

In formula (I) above, the number n is preferably an integer from 3 to 5.

In the case of a mixture of polysulphurized alkoxysilanes in accordance with Formula (I) above, in particular conventional, commercially available, mixtures, the average value of the "n"s is a fractional number, preferably between 3 and 5, more preferably close to 4.

In formula (I), A, whether substituted or not, is preferably a divalent, saturated or non-saturated hydrocarbon radical, comprising 1 to 18 carbon atoms. In particular $C_1$–$C_{18}$ alkylene groups or $C_6$–$C_{12}$ arylene groups, more particularly $C_1$–$C_{10}$ alkylenes, notably $C_2$–$C_4$ alkylenes, in particular propylene, are suitable.

$R^1$ is preferably a $C_1$–$C_6$ alkyl, a cyclohexyl or a phenyl group, in particular a $C_1$–$C_4$ alkyl group, more particularly methyl and/or ethyl.

$R^2$ is preferably a $C_1$–$C_8$ alkoxyl group or a $C_5$–$C_8$ cycloalkoxyl group, more particularly methoxyl and/or ethoxyl.

Such so-called "symmetrical" polysulphurized alkoxysilanes, and some of the processes for obtaining them are described, for example, in U.S. Pat. Nos. 5,684,171 and 5,684,172, which give a detailed list of these known compounds, for n varying from 2 to 8.

Preferably, the polysulphurized alkoxysilane used in the invention is a polysulphide, in particular a disulphide or a tetrasulphide, of bis(alkoxy($C_1$–$C_4$)silylpropyl), more preferably of bis(trialkoxy($C_1$–$C_4$)silylpropyl), in particular of bis(3-triethoxysilylpropyl) or of bis(3-trimethoxysilylpropyl).

A particularly preferred example is bis(triethoxysilylpropyl) tetrasulphide, or TESPT, having the formula $[(C_2H_5O)_3Si(CH_2)_3S_2]_2$, which is sold, for example by Degussa under the name Si69 (or X50S when it is supported to 50% by weight on carbon black), or alternatively by Witco under the name Silquest A1289 (in both cases, a commercial mixture of polysulphides having an average value of n which is close to 4).

The content of polysulphurized alkoxysilane may be within a range of 1 to 15% relative to the weight of reinforcing white filler in the rubber compositions according to the invention.

The polysulphurized alkoxysilane may be first grafted (via the "X" function) onto the diene elastomer of the composition of the invention, wherein the elastomer thus functionalized or "precoupled" comprises the free "Y" function for the reinforcing white filler. The polysulphurized alkoxysilane could also be grafted beforehand (via the "Y" function) onto the reinforcing white filler, the thus "precoupled" filler then being able to be bonded to the diene elastomer by means of the free "X" function of the coupling agent.

However, in order to achieve better processign of the compositions in the non-vulcanized state, it is preferable to use the bonding agent either granted onto the reinforcing white filler or in its free, non-grafted, state.

The rubber compositions according to the invention also contain all or part of the additives usually used in sulphur-cross-linkable diene rubber compositions intended for the manufacture of tires, such as, plasticizers, pigments, antioxidants, antiozonants, a cross-linking system based either on sulphur and/or peroxide and/or bismaleimides, vulcanization accelerators, vulcanization activators, extender oils, and one or more agents for covering the reinforcing white filler, such as alkyl alkoxysilanes, polyols, amines, amides, etc.

A heavy-vehicle tire according to the invention comprises a tread which is formed from a cross-linked rubber composition according to the invention having the characteristics defined above, i.e. a composition comprising:
an elastomeric matrix comprising at least one diene elastomer having at one or more chain ends a functional group which is active for coupling to a reinforcing white filler,
a reinforcing filler the majority of which is a reinforcing white filler, and
a reinforcing white filler/functionalized diene elastomer bonding agent.

The aforementioned characteristics of the present invention, as well as others, will be better understood on reading the following examples of embodiment of the invention, which are given by way of illustration and not of limitation.

In all the examples, unless indicated otherwise, the compositions are given by weight, and the properties of the rubber compositions are evaluated as follows:

Shore Hardness:
The Shore A hardness is measured in accordance with the standard ASTM D 2240-91.

Moduli of Elongation
The moduli of elongation are measured at 100% (ME100) and at 300% (ME300) in accordance with Standard ISO 37-1977

Hysteresis Losses HL:
The hysteresis losses (HL) are measured by rebound at 60° C. in accordance with standard ISO R17 667 and are expressed in %.

Dynamic Properties at 10 Hz and 60° C.:

These are the maximum modulus at low deformation (in MPa) and the maximum value of tangent delta.

Rolling Resistance:

It is evaluated (in %) on a test drum by the ratio of energies for a "control" tire and a "test" a tire, which are necessary for maintaining a given traveling speed on the test drum. The rolling resistance is improved if the "control/test" ratio is greater than 100.

Wear Resistance:

It is evaluated by the ratio (in %) of the loss of weight of a "control" tire to that of a "test" tire, the tires being identical in everything except the tread.

Increase in Weight Losses:

This value represents the relative difference (in %) between an initial weight loss rate (at the start of travel, i.e. between 0 and 50,000 km) and a final weight loss rate (at the end of its life, i.e. after travel for 100,000 km). More precisely, this increase in weight loss is defined by the ratio "(final weight loss—initial weight loss)/(initial weight loss) ". A value of increase in weight loss of less than 100% indicates an improvement relative to the "control" tire.

Start of Irregular Wear:

This value generally represents the distance covered at which the change in weight loss rate appears.

As can be seen in FIG. 1 which depicts a typical graph (the abscissa values are given merely by way of illustration), the conventional characteristic of the weight loss rate as a function of the distance traveled has, in succession:

- a first section of substantially zero gradient corresponding to normal (non-irregular) wear of the tire,
- a second, substantially linear, section of relatively high gradient, corresponding to the start of irregular wear, and
- a third section of substantially zero gradient corresponding to the end of life of the tire.

To quantify the start of the irregular wear relating to this second section, there has been used in the following examples a median value of traveling distance (see broken line on the graph in FIG. 1), which corresponds substantially to a median weight loss rate.

EXAMPLE 1

In this example, compositions for a tire tread for a heavy vehicle, intended to be mounted on a driving axle of a heavy vehicle, were tested.

Four compositions according to the invention (Compositions 3 to 6) were compared, which are all based on an SBR comprising at the chain end a functional group which is active for coupling to silica and a reinforcing filler formed of silica, with:

- a "control" composition (Composition 1) which is representative of the known prior art for a heavy-vehicle tire mounted on a driving axle. This composition is based on a blend of natural rubber (a peptized natural rubber, of Mooney ML(1+4) at 100° C. equal to 60) and a polybutadiene having a high content of cis (cis BR), with a reinforcing filler of carbon black, and
- a composition which is not in accordance with the invention (Composition 2) which is based on a blend of two non-functionalized SBRs, A and B, (SBR A is not extended with oil, whereas SBR B is extended with 35.5 parts by weight of aromatic oil) and a silica reinforcing filler.

The respective formulations of these compositions are given in Table I.

For Compositions Nos. 2 to 6, the SBRs used (A, B, C, D) are all prepared continuously and in solution. Their viscosity and microstructure characteristics are set forth in Table 1

TABLE 1

| SBR | Mooney ML (1 + 4) | Amount (%) of -1, 2 | Amount (%) of styrene |
|---|---|---|---|
| SBR A | 54 | 24 | 25 |
| SBR B | 54 | 24 | 40 |
| SBR C | 48 | 24 | 33 |
| SBR D | 48 | 24 | 30 |

The silica used in Compositions 2 to 6 is a highly dispersible silica named "Zeosil 1165 MP" which is sold by Rhodia.

For Compositions 3 to 6 according to the invention, SBR C is an SBR functionalized with hexamethylcyclotrisiloxane, such that it comprises a dimethylsilanol group at the chain end. Reference may be made to French patent specification FR-A-2 740 778 for a detailed description of the synthesis of this functionalized SBR.

It will be noted that Composition 4 differs from Composition 3 by the nature of the extender oil in the composition (paraffin oil instead of an aromatic oil).

Composition 5 differs from Composition 4 in that it comprises a covering agent "Si 116" (hexadecyltrimethoxysilane) for the silica.

Composition 6 differs from Compositions 3 and 4 in that its elastomeric matrix is formed of a blend of 70 parts by weight of functionalized SBR C with 30 parts by weight of an SBR D which does not have a function which is active for coupling to silica (SBR D is a SBR starred with $SnCl_4$)

Each of these compositions was vulcanized at a temperature of 150° C., for a time sufficient to achieve 99% of the maximum value of the torque measured at the rheometer.

TABLE 2

| Composition | Comp. 1 | Comp. 2 | Comp. 3 | Comp. 4 | Comp. 5 | Comp. 6 |
|---|---|---|---|---|---|---|
| NR | 60 | — | — | — | — | — |
| cis BR | 40 | — | — | — | — | — |
| SBR A | — | 50 | — | — | — | — |
| SBR B | — | 68.75 | — | — | — | — |
| SBR C | — | — | 100 | 100 | 100 | 70 |
| SBR D | — | — | — | — | — | 30 |
| N234 | 54 | — | — | — | — | — |
| Zeosil 1165 MP | — | 57.5 | 65 | 65 | 65 | 65 |
| X50S | — | 9 | 10.2 | 10.2 | 10.2 | 10.2 |
| Aromatic oil | — | — | 18.75 | — | — | — |
| Paraffin oil | — | — | — | 18.75 | 18.75 | 18.75 |
| Paraffin | 1 | 1 | 1 | 1 | 1 | 1 |
| ZnO | 3.0 | 2.5 | 2.5 | 2.5 | 2.5 | 2.5 |
| Stearic acid | 1.5 | 2.0 | 2.0 | 2.0 | 2.0 | 2.0 |
| Diphenyl-guanidine | — | 1.1 | 1.25 | 1.25 | 1.25 | 1.25 |
| Antioxidant | 2 | 2 | 2 | 2 | 2 | 2 |
| Si 116 | — | — | — | — | 1.5 | — |
| Soluble sulphur | 1.1 | 1.2 | 1.2 | 1.2 | 1.2 | 1.2 |
| CBS | 1.1 | 2 | 1.2 | 1.2 | 1.2 | 1.2 |
| ZBEC | — | — | 0.2 | 0.2 | 0.2 | 0.2 |

In Table 2:

"X50S" is a silica/elastomer bonding agent sold by Degussa that is formed by the association of the bonding agent "Si69" (bis-3-(triethoxysilylpropyl) tetrasuiphide) and carbon black N330 in a 50/50 weight ratio.

the antioxidant is N-(1,3-dimethylbutyl) N'-phenyl p-phenylene diamine (abbreviated 6PPD);

"CBS" and "ZBEC" are vulcanization accelerators (cyclohexyl benzothiazyl sulphanamide and zinc dibenzyldithiocarbamate, respectively).

The properties in the vulcanized state of Compositions 1 to 6 were compared. The results are set forth in Table 3.

TABLE 3

| Composition | Comp. 1 | Comp. 2 | Comp. 3 | Comp. 4 | Comp. 5 | Comp. 6 |
|---|---|---|---|---|---|---|
| Shore A | 64 | 65 | 66 | 64 | 62 | 67 |
| ME100 | 2.00 | 2.05 | 2.20 | 2.13 | 2.03 | 2.20 |
| ME300/ME100 | 1.16 | 1.15 | 1.45 | 1.45 | 1.525 | 1.425 |
| HL (%) | 28 | 23.5 | 19.9 | 18.3 | 16.1 | 20.8 |
| Dynamic properties: | | | | | | |
| Maximum modulus (MPa) | 6.26 | 3.87 | 3.05 | 2.65 | 2.01 | 3.48 |
| Maximum tangent delta | 0.193 | 0.180 | 0.125 | 0.116 | 0.096 | 0.142 |
| Results during travel | | | | | | |
| Rolling resistance | 100 | 104 | 113 | 114 | 118 | 111 |
| Wear resistance (%) | 100 | 52 | 104 | 112 | 104 | 107 |
| Increase in weight loss (%) | 100 | | 89 | 87 | 91 | 86 |
| Start of irregular wear (1000 km) | 48 | | 80 | 80 | 80 | 80 |

Table 3 shows that for Compositions 3, 4, 5 and 6 according to the invention, the rolling resistance is notably reduced, the wear resistance increased and the delay in the appearance of the irregular wear is significantly increased, relative to the "control" Composition No. 1 based on the NR/BR blend and carbon black, as well as to Composition No. 2 "not in accordance" based on non-functionalized SBR and silica.

In particular, it will be noted that the appearance of the phenomenon of irregular wear is clearly delayed for Compositions 3 to 6 according to the invention. This appearance corresponds to a traveling distance which is substantially doubled relative to that for Compositions 1 and 2.

This delay in the appearance of the irregular wear, added to the reduction in rolling resistance, represents a technical prejudice which has been overcome. In actual fact, it is known to those skilled in the art that for heavy-vehicle tires mounted on a driving axle, when the rolling resistance decreases, the resistance to irregular wear increases, and conversely.

EXAMPLE 2

In this example, compositions for tire treads for a heavy-vehicle, intended to be mounted on a steering axle of a heavy vehicle were tested.

Compositions 4 and 5 according to the invention of Example 1 were compared with:

a "control" composition (Composition No. 7), the elastomeric matrix of which is formed from natural rubber (peptized natural rubber of Mooney ML(1+4) at 100° C. of 60) with a reinforcing filler of carbon black, and Composition 2 which is not in accordance with the invention of Example 1.

It will be noted that "control" Composition 7 comprises an RF aralkyl resin and an extender oil different from that in Compositions 2, 4 and 5. In addition to the antioxidant "6PPD" in Compositions 2, 4 and 5, Composition 7 contains an additional antioxidant designated by the abbreviation "TMQ" (trimethylquinoline formed of a polymerized 1,2-dihydro-2,2,4trimethylquinone).

Each of these compositions was vulcanized at a temperature of 150° C., for a time sufficient to achieve 99% of the maximum value of the torque measured at the rheometer.

The constituents of Compositions 2, 4, 5 and 7 are given in Table 4.

TABLE 4

| Composition | Comp. 7 | Comp. 2 | Comp. 4 | Comp. 5 |
|---|---|---|---|---|
| N-R | 100 | — | — | — |
| SBR A | — | 50 | — | — |
| SBR B | — | 68.75 | — | — |
| SBR C | — | — | 100 | 100 |
| N375 | 47.5 | — | — | — |
| Zeosil 1165 | — | 57.5 | 65 | 65 |
| X50S | — | 9 | 10.2 | 10.2 |
| Paraffin oil | — | — | 18.75 | 18.75 |
| RF Aralkyl resin | 1 | — | — | — |
| Oil Hexa 2.5 | 0.5 | — | — | — |
| Paraffin | 1 | 1 | 1 | 1 |
| ZnO | 3.0 | 2.5 | 2.5 | 2.5 |
| Stearic acid | 2.5 | 2.0 | 2.0 | 2.0 |
| Diphenylguanidine | — | 1.1 | 1.25 | 1.25 |
| Antioxidant (6PPD) | 2 | 2 | 2 | 2 |
| TMQ | 1 | — | — | — |
| Si 116 | — | — | — | 1.5 |
| Soluble sulphur | 1.5 | 1.2 | 1.2 | 1.2 |
| CBS | 0.6 | 2 | 1.2 | 1.2 |
| ZBEC | — | — | 0.2 | 0.2 |

In Table 4:

the "RF aralkyl" resin is a resorcinol formol resin and the oil Hexa 2.5 is an oil based on hexadecylamine.

The properties in the vulcanized state of Compositions 2, 4, 5 and 7 were compared.

The results are set forth in Table 5.

TABLE 5

| Composition | Comp. 7 | Comp. 2 | Comp. 4 | Comp. 5 |
|---|---|---|---|---|
| Shore A | 64 | 65 | 64 | 62 |
| ME100 | 2.10 | 2.05 | 2.13 | 2.03 |
| ME300/ME100 | 1.247 | 1.15 | 1.45 | 1.525 |
| HL (%) | 23 | 23.5 | 18.3 | 16.1 |
| Dynamic properties | | | | |
| Maximum modulus (MPa) | 4.61 | 3.87 | 2.65 | 2.01 |
| Maximum tangent delta | 0.144 | 0.180 | 0.116 | 0.096 |
| Results during travel | | | | |
| Rolling resistance (%) | 100 | 79 | 107 | 109 |
| Wear resistance | 100 | 94 | 100 | 97 |
| Increase in weight loss | 100 | | 28 | 64 |
| Start of irregular wear (103 km) | 79 | | 95 | 95 |

Table 5 shows that for Compositions 4 and 5 according to the invention, the rolling resistance is notably reduced, the wear resistance substantially the same and the delay in the appearance of the irregular wear is increased, relative to the "control" Composition No. 7 based on NR and carbon black, as well as to Composition No. 2 "not in accordance" based on non-functionalized SBR and silica.

Furthermore, it will be noted that for the tread Compositions 4 and 5 according to the invention, the increase in weight loss is significantly reduced relative to that of "control" Composition 7, which indicates a reduced level of irregular wear for Compositions 4 and 5 according to the invention.

What is claimed is:

1. A method for delaying, during travel, appearance of irregular wear in a tread of a tire suitable for bearing heavy loads, the method comprising: preparing by thermomechanical working a rubber composition comprising:

(a) an elastomeric matrix comprising a functionalized diene elastomer co-polymer formed from a conjugated diene monomer and a vinyl-aromatic compound, the co-polymer having a glass transition temperature of between −70° C. and −20° C. and a mass content of vinyl-aromatic units of from 10% to 50%, the elastomer having at one or more of its chain ends a functional group which is active for coupling to a reinforcing white filler, the functional group being selected from the group consisting of a silanol group and a polysiloxane block having a silanol end;

(b) a reinforcing filler comprising at least 50% by weight of silica, the silica having a CTAB specific surface area of from 80 $m^2/g$ to 260 $m^2/g$; and (c) a reinforcing white filler/functionalized diene elastomer bonding agent; and forming the tread from the composition.

2. The method according to claim 1, wherein the reinforcing white filler/functionalized diene elastomer bonding agent is a polysulphurized alkoxysilane.

3. The method according to claim 1, wherein the composition further comprises an alkyl alkoxysilane covering agent for the reinforcing white filler.

4. The method according to claim 1, wherein the silica is present in the composition in an amount of from 20 phr to 80 phr (parts by weight of the elastomeric matrix).

* * * * *